(12) United States Patent
Wagner et al.

(10) Patent No.: US 9,721,218 B2
(45) Date of Patent: Aug. 1, 2017

(54) DETERMINING THE USER-SPECIFIC RELEVANCE OF APPLICATIONS

(71) Applicants: Guido Wagner, Rauenberg (DE); Christina Hall, Unterhof (DE); Gisbert Loff, Hockenheim (DE)

(72) Inventors: Guido Wagner, Rauenberg (DE); Christina Hall, Unterhof (DE); Gisbert Loff, Hockenheim (DE)

(73) Assignee: SAP SE, Walldorf (DE)

( * ) Notice: Subject to any disclaimer, the term of this patent is extended or adjusted under 35 U.S.C. 154(b) by 622 days.

(21) Appl. No.: 14/059,266

(22) Filed: Oct. 21, 2013

(65) Prior Publication Data

US 2015/0112752 A1    Apr. 23, 2015

(51) Int. Cl.
    *G06Q 10/00*    (2012.01)
    *G06Q 10/06*    (2012.01)
    *G06F 3/0482*    (2013.01)

(52) U.S. Cl.
    CPC ..... *G06Q 10/06316* (2013.01); *G06F 3/0482* (2013.01)

(58) Field of Classification Search
    CPC .. G06Q 10/00; G06Q 40/00; G06Q 10/06315; G06F 17/60; G06F 3/0482
    USPC ........................................................ 705/7.26
    See application file for complete search history.

(56) References Cited

U.S. PATENT DOCUMENTS

| | | | |
|---|---|---|---|
| 7,370,276 B2 | 5/2008 | Willis | |
| 7,437,679 B2* | 10/2008 | Uemura | G06Q 10/109 700/100 |
| 7,536,652 B2* | 5/2009 | Uemura | G06Q 10/109 709/206 |
| 8,117,197 B1 | 2/2012 | Cramer | |
| 8,121,883 B2* | 2/2012 | Johnson | G06Q 10/063 705/301 |
| 8,533,213 B2 | 9/2013 | Yassin | |
| 8,666,373 B2 | 3/2014 | Dessouky et al. | |
| 8,713,458 B2 | 4/2014 | Mattila et al. | |
| 8,731,821 B2 | 5/2014 | Sheynblat | |
| 8,751,743 B2 | 6/2014 | Burge | |
| 8,793,154 B2 | 7/2014 | Evans et al. | |
| 2012/0023101 A1 | 1/2012 | Heimendinger et al. | |
| 2012/0023438 A1 | 1/2012 | Xia et al. | |
| 2012/0166284 A1 | 6/2012 | Tseng | |
| 2013/0014040 A1 | 1/2013 | Jagannathan et al. | |
| 2013/0086483 A1 | 4/2013 | Vainer et al. | |

(Continued)

*Primary Examiner* — Romain Jeanty
(74) *Attorney, Agent, or Firm* — Mintz Levin Cohn Ferris Glovsky and Popeo, P.C.

(57) ABSTRACT

The subject matter disclosed herein provides methods for determining the user-specific relevance of various applications and displaying a graphical representation of these relevance values. The method may receive information from one or more applications installed on a device. This information may include importance parameters, importance parameter values, urgency parameters, and urgency parameter values associated with each application. A composite importance value and a composite urgency value may be determined for each application. A relevance value may be determined for each application based on the composite importance value and composite urgency value. A graphical representation of the relevance of each application may be displayed on the device. Related apparatus, systems, techniques, and articles are also described.

26 Claims, 9 Drawing Sheets

(56) References Cited

U.S. PATENT DOCUMENTS

| | | | |
|---|---|---|---|
| 2013/0218991 A1* | 8/2013 | McConnell | G06F 17/30702 709/206 |
| 2013/0268889 A1 | 10/2013 | Barak et al. | |
| 2014/0187269 A1 | 7/2014 | Zinin | |
| 2014/0250433 A1 | 9/2014 | Stekkelpak et al. | |

* cited by examiner

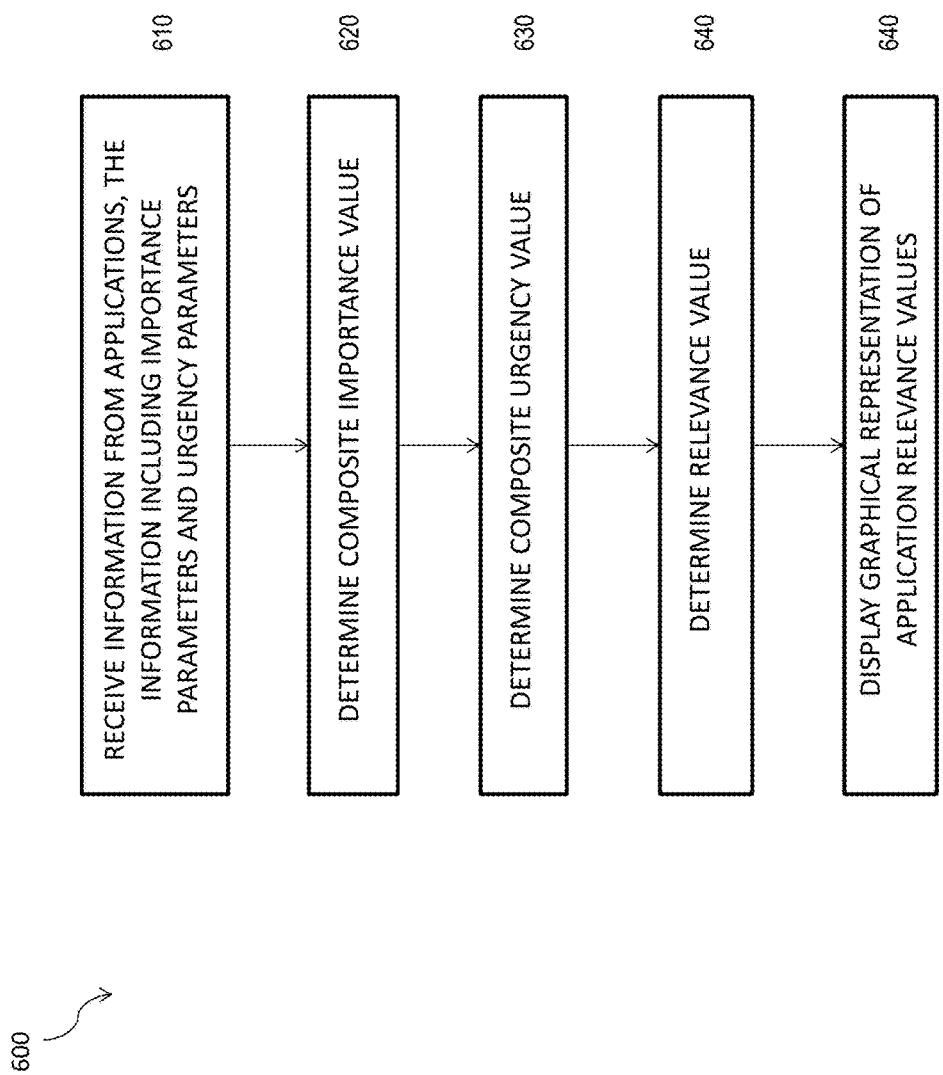

DETERMINING THE USER-SPECIFIC RELEVANCE OF APPLICATIONS

TECHNICAL FIELD

This disclosure relates generally to the prioritization of applications installed on a device based on an application's relevance to a user.

BACKGROUND

Employers are asking more of their employees today than ever before. As job responsibilities stretch, many employees find themselves working on different types of projects and in different roles throughout the day. For examples, a junior sales associate may be responsible for tracking customer invoices, following-up on purchase orders, processing customer complaints, and the like. A department manager may be responsible for conducting employee performance reviews, creating monthly budget reports, following-up on new business leads, and the like. Each of these tasks generally requires the use of its own dedicated software application. As an employee's responsibilities grow, the number of applications that he/she may use during the course of the day may increase as well. The shift from traditional monolithic applications to task specific applications also increases the number of applications that an employee may use. Keeping track of these applications as well as the various projects and tasks associated with each application may be difficult.

SUMMARY

In some implementations, methods and apparatus, including computer program products, are provided for determining the user-specific relevance of various applications and displaying a graphical representation of these relevance values.

In one aspect, information from one or more applications installed on a device is received. The received information includes or more importance parameters associated with each application and one or more urgency parameters associated with each application. The one or more importance parameters have one or more corresponding importance parameter values, and the one or more urgency parameters have one or more corresponding urgency parameter values. A composite importance value is determined for each application. The composite importance value is based on the one or more importance parameter values associated with each application. A composite urgency value is determined for each application. The composite urgency value is based on the one or more urgency parameter values associated with each application. A relevance value is determined for each application based on the composite importance value for each application and the composite urgency value for each application. A graphical representation of the relevance of each application is displayed on the device.

The above methods, apparatus, and computer program products may, in some implementations, further include one or more of the following features.

The relevance value of each application may be ranked from a highest relevance value to a lowest relevance value before the graphical representation is displayed on the device.

The graphical representation displayed on the device may include a user interface having one or more icons. Each icon may be associated with one of the applications and positioned on the user interface based on the ranking. The graphical representation may also include a prioritized list of the one or more applications. The prioritized list may be sorted based on the ranking.

The one or more urgency parameters of an application may be associated with a timeliness of one or more activities performed by a user using the application. The one or more urgency parameters of the application may be based on at least a predetermined urgency value, one or more due dates associated with the one or more activities, a role of the user, a location of the user, a schedule of the user, and an amount of time required to perform the one or more activities.

The one or more importance parameters of an application may be associated with one or more activities associated with one or more roles of a user. The one or more importance parameters of the application may be based on at least a predetermined importance value, a number of uncompleted activities, how often the application is used, when the application is used, a location of the user, a schedule of the user, whether the application is optimized for use on the device, whether the application requires network connectivity, and whether the device is connected to a network.

At least one of the one or more importance parameters may be associated with a scaling variable. The scaling variable may represent a weight of the at least one importance parameter.

The composite urgency value for each application may be equal to a maximum urgency value of the one or more urgency parameters associated with the application.

The composite importance value for each application may be equal to a sum of the one or more importance values of the one or more importance parameters associated with the application.

The relevance value for each application may be equal to $$\sqrt{\text{Composite Importance Value}^2 + \text{Composite Urgency Value}^2}.$$

The information from the one or more applications may be received when the one or more applications are opened, when the one or more applications are closed, at predetermined intervals while the one or more applications are open, at predetermined intervals while the one or more applications are closed, or when a user causes the device to display a home screen.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

FIG. 6 illustrates a process for displaying a graphical representation of various application relevance values, in accordance with some example implementations.

Like reference symbols in the various drawings indicate like elements.

DETAILED DESCRIPTION

In order to manage the number of applications used throughout the day, this application discloses techniques for prioritizing the relevance of these applications for a specific user. A monitoring tool may receive information from one or more applications regarding the application's importance and urgency. Using this received information, the monitoring tool may determine the relevance value of the application, compare this application's relevance value with the relevance values of other applications, and present a prioritized list of applications to a user based on each application's relevance value.

Figure 1:
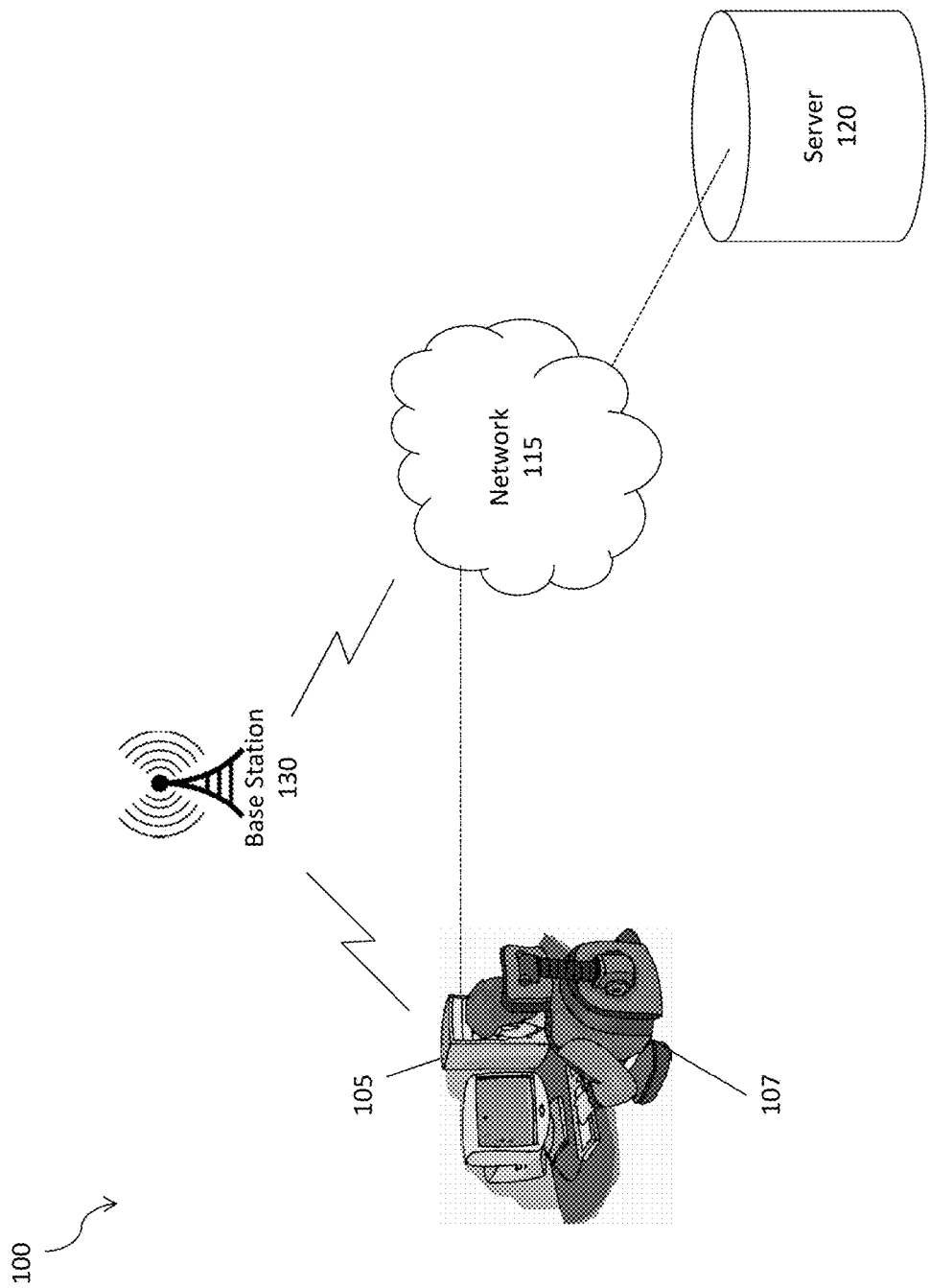
FIG. 1 illustrates a system for determining the user-specific relevance of various applications and the location of a user, in accordance with some example implementations.

FIG. 1 illustrates a system 100 for determining the user-specific relevance of various applications and the location of a user. System 100 includes a computing device 105 that may be connected to a server 120 via network 115 or base station 130 (or other wireless or cellular phone infrastructures). While computing device 105 is illustrated as a desktop computer, this computing device may also be a portable device such as a laptop computer, a personal digital assistant, a smartphone, and the like. In some implementations, computing device 105 may communicate wirelessly with base station 130. Base station 130 may determine geoinformation regarding computing device 105 (e.g., the user's location) and transmit this geoinformation to the computing device or to server 120 via network 115.

User 107 may use computing device 105 to perform one or more activities related to the user's role. User 107 may have one or more roles, and these roles may correspond to the user's position in a company, the department that the user belongs to, and the like. For example, a new employee in the finance department may have a finance employee role. In another example, a manger in the finance department may have a finance employee role and a manger role. User 107 may operate one or more applications using computing device 105 to perform his/her job responsibilities. These applications may be installed locally on computing device 105. In some implementations, these applications may be hosted on server 120 and accessed remotely via network 115.

Figure 2:
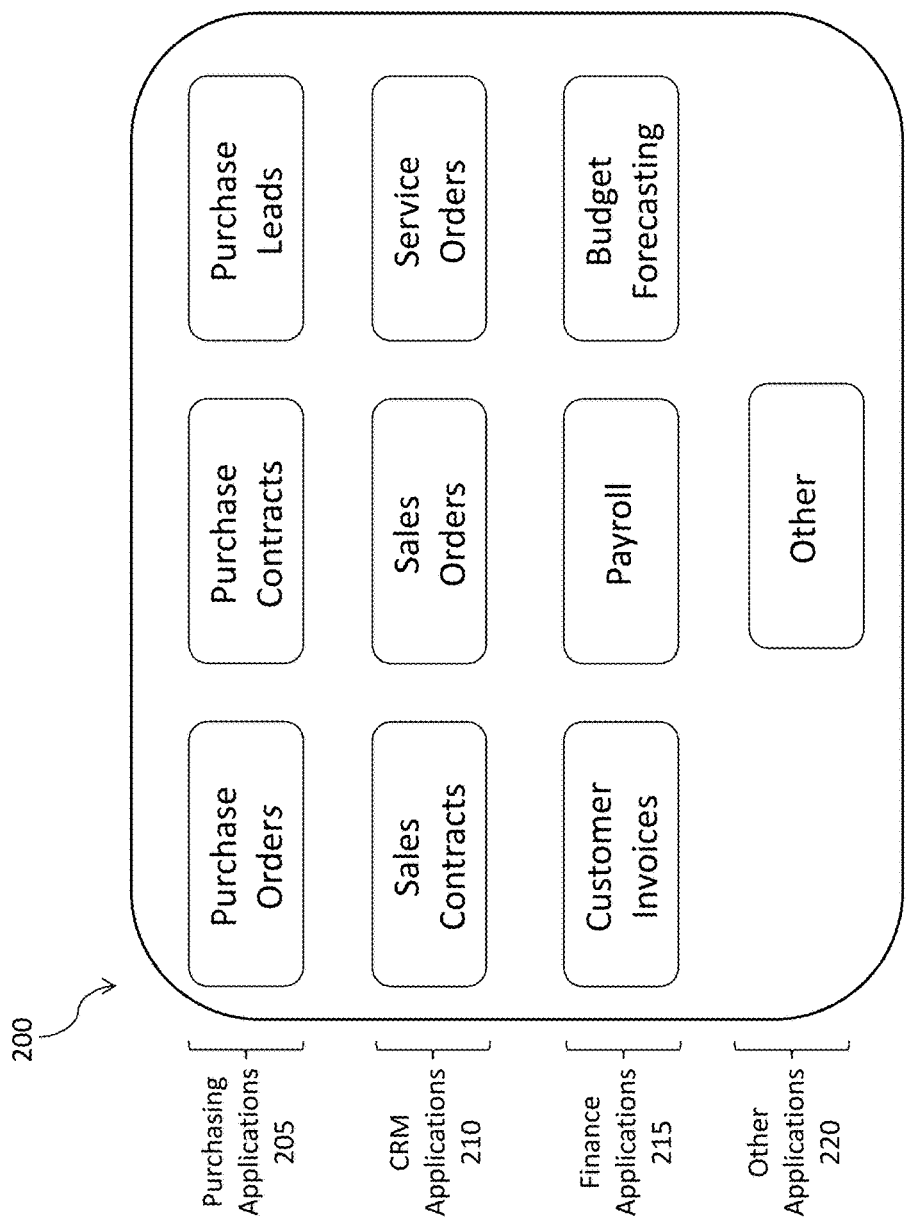
FIG. 2 illustrates a user interface, in accordance with some example implementations.

FIG. 2 illustrates a user interface 200 that may be displayed on computing device 105. User interface 200 may include one or more icons that represent the applications installed on computing device 105. These applications may include a set of purchasing applications 205 (which may include "Purchase Orders," "Purchase Contracts", and "Purchase Leads" applications), a set of customer relationship management (CRM) applications 210 (which may include "Sales Contracts," "Sales Orders," and "Service Orders" applications); and a set of finance applications 215 (which may include "Customer Invoices," "Payroll," and "Budget Forecasting" applications). In some implementations, applications 205, 210, and 215 may request and receive data from server 120. While the implementation of FIG. 2 displays purchasing, CRM, and finance applications, other types of applications 220 may be displayed on user interface 200 as well.

Throughout the course of a day, user 107 may perform various tasks relating to his/her role using one or more of applications 205, 210, and 215. If the number of tasks is large, user 107 may become quickly overwhelmed. For example, when user 107 start his/her workday, he/she may have multiple purchase orders to process using the "Purchase Orders" application, multiple pending contracts to edit using the "Sales Contracts" application, and payroll duties to complete using the "Payroll" application. Some tasks may require immediate attention (e.g., activities with impending due dates or activities that create a bottleneck in a business process). The completion of certain tasks may also affect important key performance indicators (KPIs) for user 107 and his/her department. In order to prioritize these tasks (and, consequently, which applications to use), a monitoring tool implemented in computing device 105 may determine the relevance of each application for the user's various roles and propose which applications should be used based on each application's relevance. In some implementations, the monitoring tool may be hosted on server 120 and accessed via network 115.

Whether an application is relevant to a user may depend on the tasks or activities that the application performs. Generally, an activity is relevant to a user if the activity is important and/or urgent.

An application may be important to a user if the application handles activities, processes, or business objects associated with the user's roles. For example, if user 107 is a member of the sales department, then he/she may find CRM applications 210 to be particularly important for his/her daily tasks. The importance of an activity may change over time if the user's role changes. Continuing with the previous example, if user 107 is promoted to an account manager in the sales department, then he/she may need to perform managerial tasks such as budget forecasting using financial applications 215. Whereas financial applications 215 may not have been important to user 107 before his/her promotion, these applications may become more important to the user as an account manager given the user's new responsibilities. The importance of an activity may also change if the KPI associated with the activity changes. If, for example, account manager 107 is evaluated based on the number of new customers he/she brings in during the year, then the "Sales Contacts" application in CRM applications 210 may be particularly important to the user. If, however, this metric is no longer a business priority for the sales department, then the "Sales Contacts" application may become less important for account manager 107. Because different factors or parameters may affect an application's importance, the overall importance or composite importance of an application may be represented by the independent contribution of each parameter and may be determined using the following relationship:

$$I_{App} = I_1 + I_2 + I_3 + \ldots + I_n \quad \text{(Equation 1)}$$

As indicated in Equation 1, the composite importance of an application $I_{App}$ is equal to the sum of importance parameters $I_1, I_2, I_3, \ldots,$ and $I_n$. The following table (Table 1) identifies exemplary importance parameters that may be associated with an application.

TABLE 1

Exemplary Importance Parameters.

| Importance Parameter | Description |
| --- | --- |
| $I_{Basis}$ | $I_{Basis}$ is a predetermined importance value assigned to an application. For example, if a user is an employee in the finance department (i.e., user has a finance employee role), then all finance applications may have a predetermined importance value $I_{Basis}$ for this user. This parameter may be set by an administrator and may independent from all other importance parameters. |
| $I_{AppUser}$ | $I_{AppUser}$ represents the importance of an application to a user. The value of this parameter may be set by the user when, for example, the user designates the application as a favorite application or ranks his/her favorite applications. A favorite application may always be relevant if, for example, a high importance value is associated with the application. |
| $I_{ChipFigure}$ | $I_{ChipFigure}$ represents the importance of an application based on the amount of work items to be completed by a user using the application. These work items may be associated with the user's role (e.g., a high number of open purchase orders or maintenance requests). The application may provide this parameter value to the monitoring tool. Because some applications may naturally have a high chip figure, the chip figure for these applications may be multiplied by a scaling variable to adjust their weight and de-emphasize their importance. |
| $I_{FreqRecent}$ | $I_{FreqRecent}$ represents the expected importance of an application to a user based on the user's previous usage of the application. This parameter may depend, for example, on the average number of times the user launched or started the application during a predetermined period of time ("UsageFrequency"), the ranking of the application with respect to its previous usage ("RankRecentUsage"), and whether any scaling variables apply ("$SC_{UsageFrequency}$," $SC_{RankRecentUsage}$"). In some implementations, this parameter may be calculated using the following equation: $I_{FreqRecent}$ = UsageFrequency * $SC_{UsageFrequency}$ + RankRecentUsage * $SC_{RankRecentUsage}$ |
| $I_{Time}$ | $I_{Time}$ represents the importance of an application based on the time of day a user uses the application. For example, if a user uses a particular application only from 8 a.m.-11 a.m. (e.g., uses processes open purchase orders using a purchase order application only in the morning), then this application may have a high importance value during this time period and a low importance value outside of this period. These time periods may be designated by the user or automatically determined by the application and/or computing device on which the application is installed. |
| $I_{BusRole}$ | $I_{BusRole}$ represents the importance of an application to a user based on the user's role. A user may have one or more roles and may interact with a particular application in each of these roles. Consequently, the importance of an application to a user may depend on the application's importance with respect to each role. In some implementations, this parameter may be determined using the following equation: $I_{BusRole} = \Sigma_{m,n} IF_{BR_m\ n}$ In this equation, n represents the number of roles associated with a particular application, and $IF_{BR_m}$ represents the importance of a particular role for a user having m roles. |
| $I_{BusObject}$ | $I_{BusObject}$ represents the importance of an application based on the business objects handled by the application and the user (i.e., by virtue of the user's one or more roles). This parameter's value may be equal to the sum of the importance of each business object handled by the user with respect to each of the user's roles. The user's identity may also affect the parameter's value. |
| $I_{Online}$ | $I_{Online}$ represents the importance of an application with regard to its need for a network connection. If an application needs to be connected to a network (e.g., the Internet) in order to function properly, then the importance of this application may be decreased if the computing device on which the application is installed is not connected to the network. For example, an application that monitors currency conversion rates may need to be connected to the Internet in order to track rate fluctuations. If the computing device on which the application is installed is not connected to the Internet, then this parameter may have a low importance value. In some implementations, the parameter's value may be multiplied by a scaling variable. |
| $I_{Location}$, $I_{LocationFuture}$ | $I_{Location}$ represents the importance of an application based on the user's current location. The user's current location may correspond to the location of the user's computing device (e.g., the user's laptop or smartphone) and may be determined based on information from a base station or cellular phone infrastructure. $I_{LocationFuture}$ represents the importance of an application based on the user's future location which may be stored in the user's calendar or scheduling application. These parameters may be useful when a user is on the go. For example, if a user is traveling to a customer's office, then an application having an open work item for this particular customer may have a high importance value when the user arrives at the customer's office. If, after meeting with the customer, the user has spare time to work on other matters, applications having open work items for nearby customers may have a high importance value. |
| $I_{KPI\_n}$ | $I_{KPI\_n}$ represents the importance of an application based on KPIs associated with the application and the user's roles and current achievements. |

TABLE 1-continued

Exemplary Importance Parameters.

| Importance Parameter | Description |
| --- | --- |
| $I_{RiskNoAction}$ | $I_{RiskNoAction}$ represents the importance of an application based on the risk of not taking an action or omitting a process step performed by the application. Information regarding this parameter may be tied to a risk management system. For example, if a known risk exists for not completing a particular task (e.g., responding to customer complaints within a particular period of time), then the application used to complete this task may have a high importance. |
| $I_{DeviceType}$ | $I_{DeviceType}$ represents the importance of an application based on the features of the computing device on which the application is installed. For example, applications having a user interface optimized for portable devices with small screens (e.g., smartphones) may have a higher importance value on such devices than applications without these optimized user interfaces. |
| $I_{InteractionType}$ | $I_{InteractionType}$ represents the importance of an application based on a computing device's input/output interfaces (e.g., keyboard, trackpad, microphone, speakers, and the like). For example, an application that processes voice commands may have a high importance value on a computing device having a microphone and a low importance value on a computing device that lacks the microphone. This parameter is similar to $I_{DeviceType}$. |
| $I_{ConnectivityType}$ | $I_{ConnectivityType}$ represents the importance of an application based on the connection between a network and the computing device on which the application is installed. For example, applications requiring a high speed connection and a high quality of service (e.g., video conferencing applications) may have a low importance value if the computing device on which the application is installed is connected to a dial-up modem. This parameter is similar to $I_{DeviceType}$. |
| $I_{HistBehavior}$ | $I_{HistBehavior}$ represents the importance of an application based on the user's behavior when using the application (e.g., days/times during which the application is used, locations at which the application is used, whether this application is used after using other applications, and the like). |

As previously discussed, whether an application is relevant may also depend on the application's urgency. An application may be urgent to a user if the activities performed by the application are urgent. An activity may be urgent if, for example, there is an impending due date or if the activity is otherwise designated a high priority. The latter condition may apply in a variety of situations. For example, it may be more urgent to fill a purchase order for a large client that provides frequent repeat business than a purchase order for a small client. The urgency of an activity may change for a variety of reasons including, for example, a change in due date, a change in feasibility (e.g., it may be less urgent to fill a sales order if there is a shortage of parts), if the activity occurs during a resting period (e.g., a holiday break), and the like. Because different factors or parameters may affect the urgency of an application, the overall urgency or composite urgency of an application may be represented by the independent contribution of each parameter and may be determined using the following relationship:

$$U_{APP} = \max(U_1, U_2, U_3, \ldots, U_n) \quad \text{(Equation 2)}$$

As indicated in Equation 2, the composite urgency of an application $U_{App}$ is equal to the maximum urgency associated with urgency parameters $U_1, U_2, U_3, \ldots,$ and $U_n$. The following table (Table 2) identifies exemplary urgency parameters that may be associated with each application.

TABLE 2

Exemplary Urgency Parameters.

| Urgency Parameter | Description |
| --- | --- |
| $U_{AppUser}$ | $U_{AppUser}$ represents the minimum urgency of an application to a user. The value of this parameter may be defined by the user. |
| $U_{BusRole}$ | $U_{BusRole}$ represents the urgency of activities to be performed by an application based on the user's role. |
| $U_{BusObjects}$ | $U_{BusObject}$ represents the urgency of activities to be performed by an application based on the business objects handled by the application and the user (i.e., by virtue of the user's one or more roles). |
| $U_{RemainOnline}$ | $U_{RemainOnline}$ represents the urgency of activities to be performed by an application based on the time the user is expected to remain online (e.g., connected to a network). For example, if the user is scheduled to attend a meeting in one hour, an application having an open work item that may be completed in less than an hour may have a high urgency value. Information from a scheduling application or calendar may be used to determine whether the user is expected to remain online. |
| $U_{TimeToMeeting}$ | $U_{TimeToMeeting}$ represents the urgency of activities to be performed by an application based on the amount of time the user has until a meeting or other activity. This parameter is similar to $U_{RemainOnline}$ and may require information from a scheduling application or calendar. |

TABLE 2-continued

Exemplary Urgency Parameters.

| Urgency Parameter | Description |
| --- | --- |
| $U_{Location}$, $U_{LocationFuture}$ | $U_{Location}$ and $U_{LocationFuture}$ represent the urgency of activities to be performed by an application based on a user's current location and future location, respectively. The user's current location may correspond to the location of his/her computing device and may be determined based on information from a base station or cellular phone infrastructure. Information from a scheduling application, calendar, or GPS enabled application may also be used to determine the user's location. For example, if a user is traveling to a customer's office, then an application having an open work item for this particular customer may have a high urgency value if the open work item has an impending due date and the user has arrived at the customer's office. If the open work item has a distant due date, then the value of this parameter may be low. |
| $U_{RiskNoAction}$ | $U_{RiskNoAction}$ represents the urgency of activities to be performed by an application based on the risk of not taking an action or omitting a process step performed by the application. Information regarding this parameter may be tied to a risk management system. |
| $U_{Timespan}$ | $U_{Timespan}$ represents the urgency of activities to be performed by an application based on the duration of the activities or the estimated completion time of these activities. |

Figure 3:
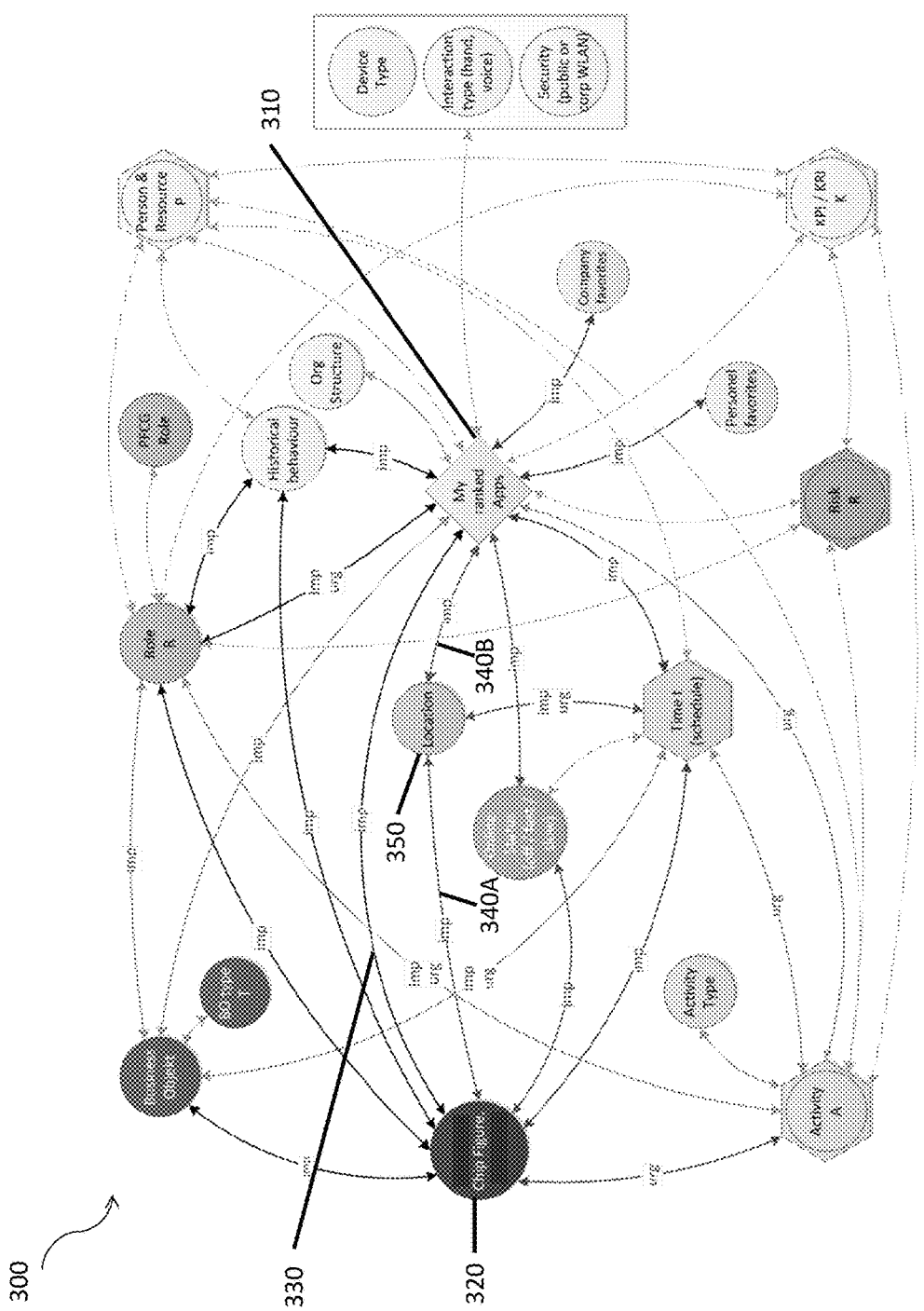
FIG. 3 illustrates the relationship between various importance parameters and urgency parameters, in accordance with some example implementations.

The importance and urgency parameters defined in Tables 1 and 2 may influence each other and the overall relevance of an application. FIG. 3 illustrates relationships between some of these parameters and their influence on a user's relevant applications (MyRankedApps 310). The influence that each parameter has on MyRankedApps 310 may depend on the type of path (i.e., direct or indirect) between the parameter and MyRankedApps 310.

For example, a direct path 330 may connect Chip FIG. 320 to MyRankedApps 310. Direct path 330 may represent the direct influence that Chip FIG. 320 has on application importance (and, consequently, application relevance) as discussed above with respect to Table 1.

Chip FIG. 320 may also be connected to MyRankedApps 310 via intervening Location parameter 350 along indirect paths 340A and 340B. These indirect paths represent the influence that each parameter has on the other. For example, a manager's responsibilities may include time sheet approval. If, for example, the manager has a large number of time sheets to approve, the chip figure associated with a time sheet approval application may be high. If, however, the manager travels to a client's office (i.e., changes his/her location), then the relevance of this application may become low despite the high chip figure because the manager is unlikely to complete this task during a client visit.

The applications installed on computing device 105 may be configured to monitor the importance parameters and urgency parameters defined in Tables 1 and 2, respectively, and send information regarding these parameters and their corresponding values to the monitoring tool implemented in computing device 105. An application may, for example, send importance and urgency parameter information and their corresponding values when the application is opened, when the application is closed, at predetermined intervals while the application is open or closed, or upon request from the monitoring tool. In some implementations, these applications may send importance and urgency parameter information and their corresponding values when a user causes the computing device 105 to display the home screen (e.g., the desktop). In some implementations, only currently opened applications (rather than all applications) may send parameter and value information when the home screen is displayed.

Upon receiving importance and urgency parameter information and their corresponding values from the applications, the monitoring tool may determine the composite importance value and composite urgency value for these applications using Equations 1 and 2, respectively. Upon determining these composite values, the monitoring tool may determine the relevance of each application.

Figure 4:
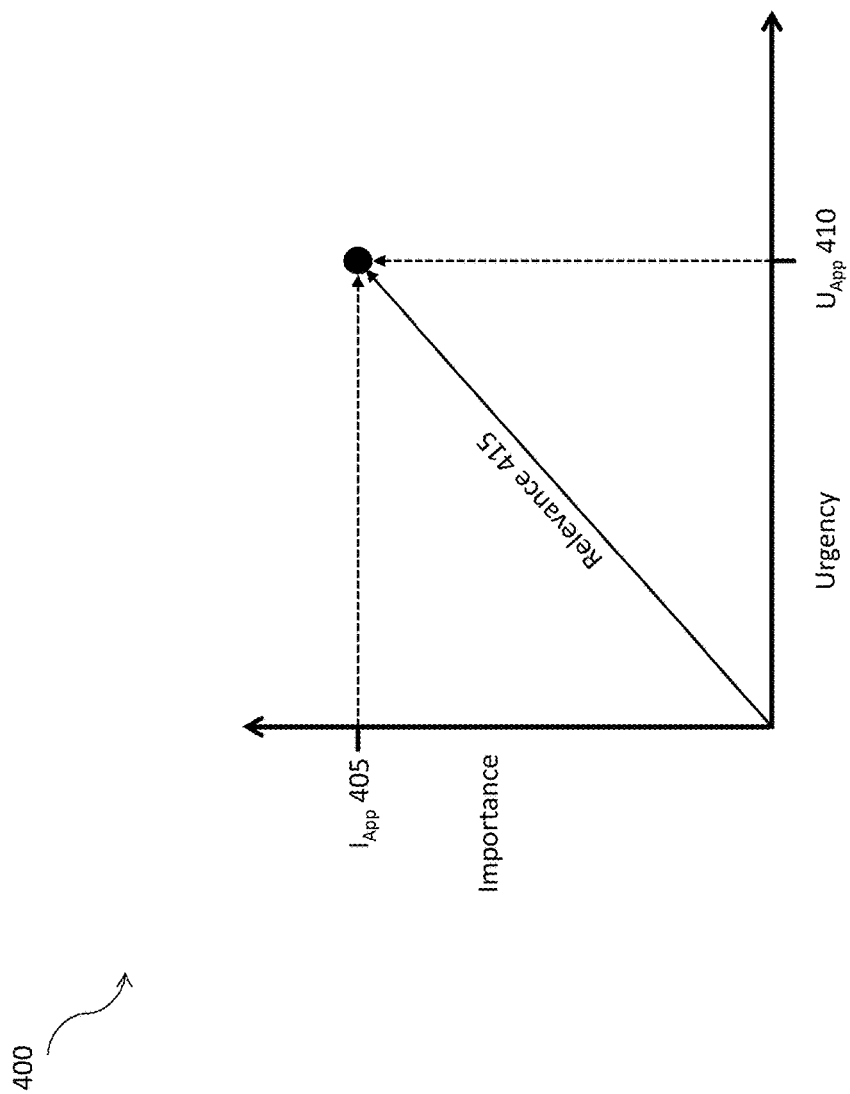
FIG. 4 illustrates, the relationship between the importance, urgency, and relevance of an application to a user in accordance with some example implementations.

FIG. 4 illustrates a relationship between the importance, urgency, and relevance of an application to a user. In chart 400, the urgency of an application may be measured along the horizontal axis, and the importance of the application may be measured along the vertical axis. If, for example, the application has a composite importance $I_{App}$ 405 and a composite urgency $U_{App}$ 410, then the relevance of the application to a user may be represented by diagonal line 415. In some implementations, the relevance of the application may be calculated using the following equation:

$$\text{Relevance} = \sqrt{I_{App}^2 + U_{App}^2} \qquad \text{(Equation 3)}$$

As evident from FIG. 4 and equation 300, the relevance of an application to a user may be high when the application's composite importance and composite urgency are high. Likewise, the relevance of an application to a user may be low when the application's composite importance and composite urgency are low.

Once the relevance values of these applications is determined, the monitoring tool may rank these applications from highest relevance to lowest relevance. The monitoring tool may use the information in this ranking to generate and display a graphical representation of each application's relevance. FIGS. 5A, 5B, 5C, and 5D illustrate different graphical representations of these relevance values. The implementations illustrated in these figures are merely exemplary, and other types of graphical representations may be used including, for example, pie charts, histograms, tree charts, timeline charts, and the like. A user may use the information in these graphical representations to determine which application to use next.

Figure 5A:
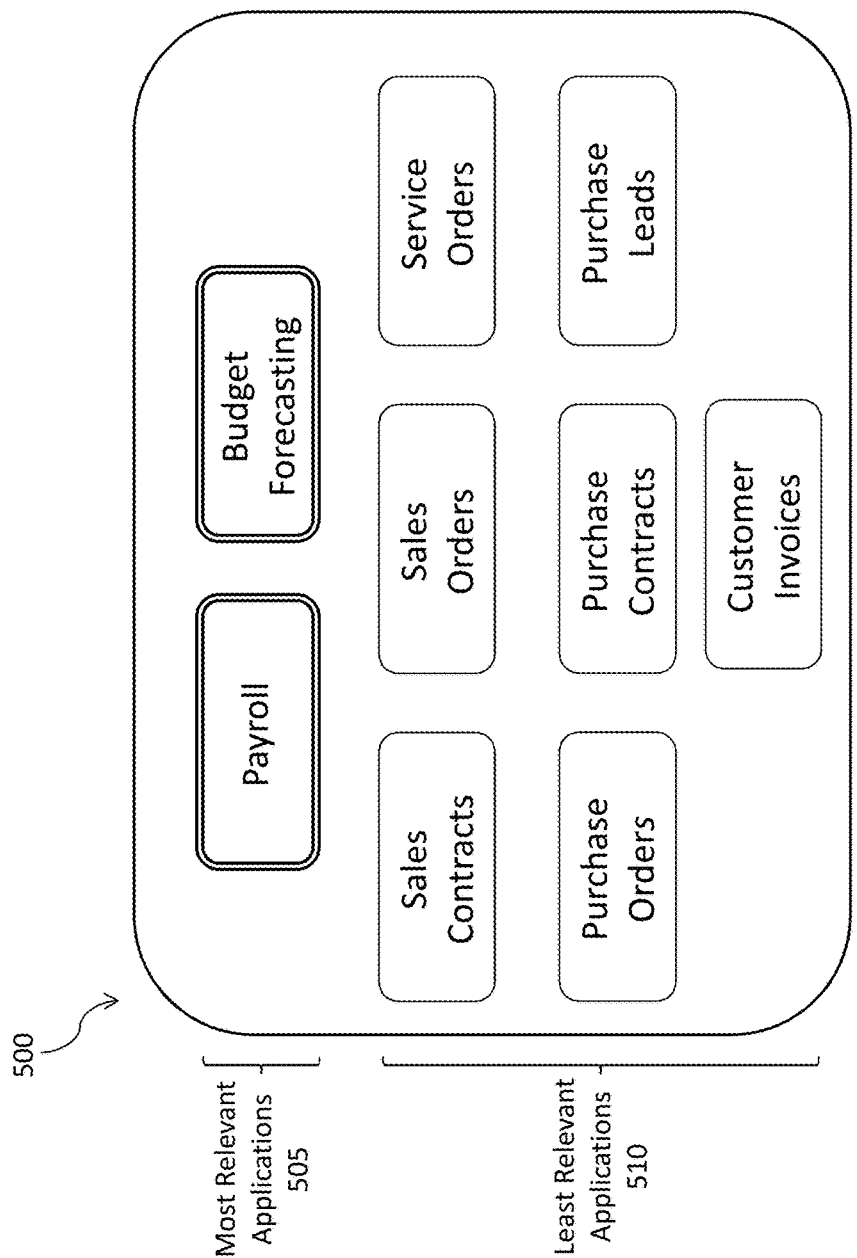
FIGS. 5A, 5B, 5C, and 5D illustrate graphical representations of application relevance values, in accordance with some example implementations.

FIG. 5A illustrates a user interface 500 that may be displayed on computing device 105. User interface 500 is similar to user interface 200 illustrated in FIG. 2. After the monitoring tool determines the relevance values of the applications in FIG. 2 and ranks them from highest relevance to lowest relevance, the monitoring tool may adjust the position, size, and/or shape of the icons on user interface 500 such that the most relevant applications are more visibly prominent than less relevant applications. In the implementation of FIG. 5A, the most relevant applications 505 may be positioned at the top of user interface 500, and the least relevant applications 510 may be positioned at the bottom of the user interface. User interface 500 may also use different shapes or borders for most relevant applications 505 in order to visually distinguish these applications from least relevant applications 510.

Figure 5B:
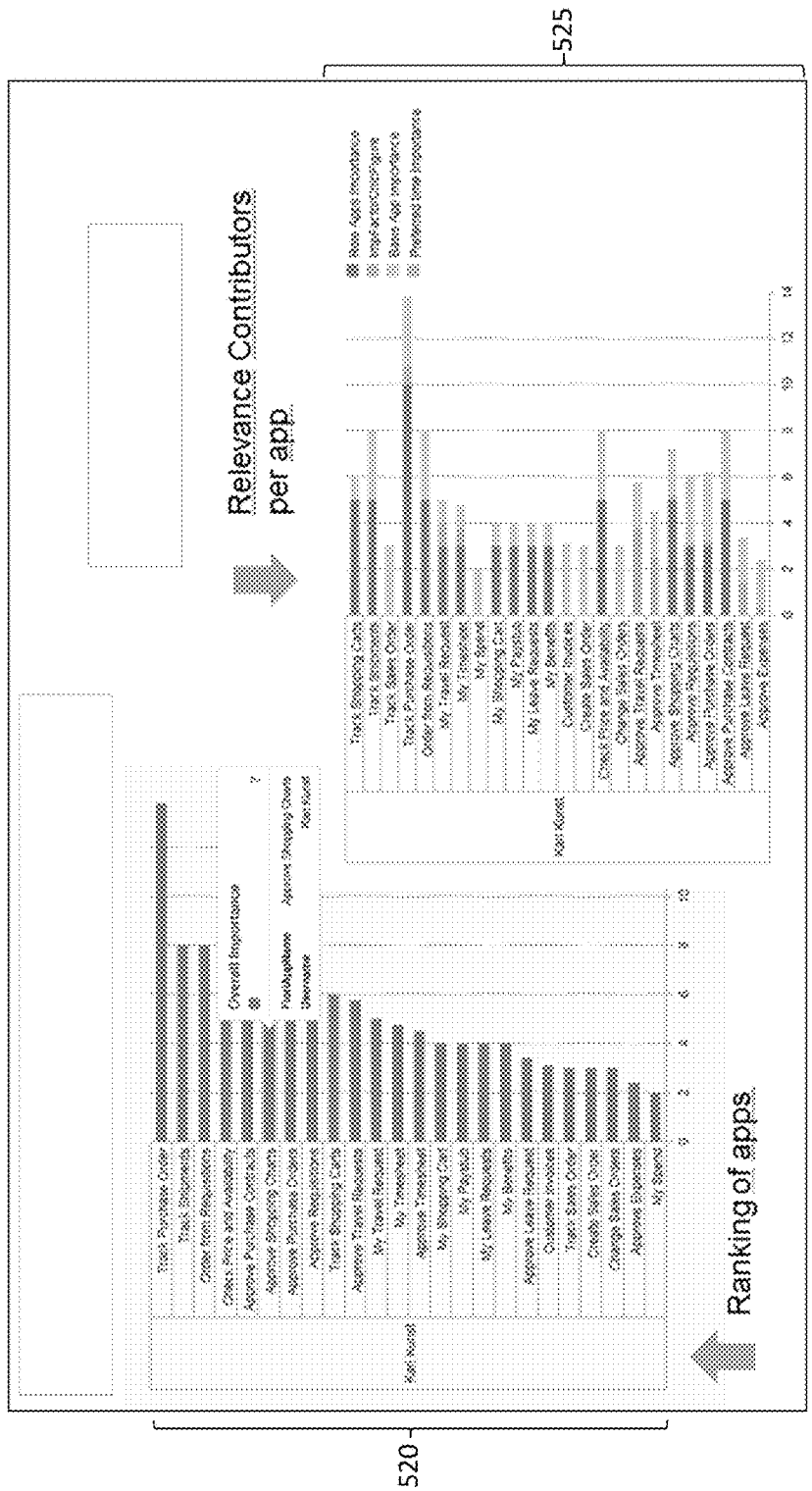
Figure 5C:
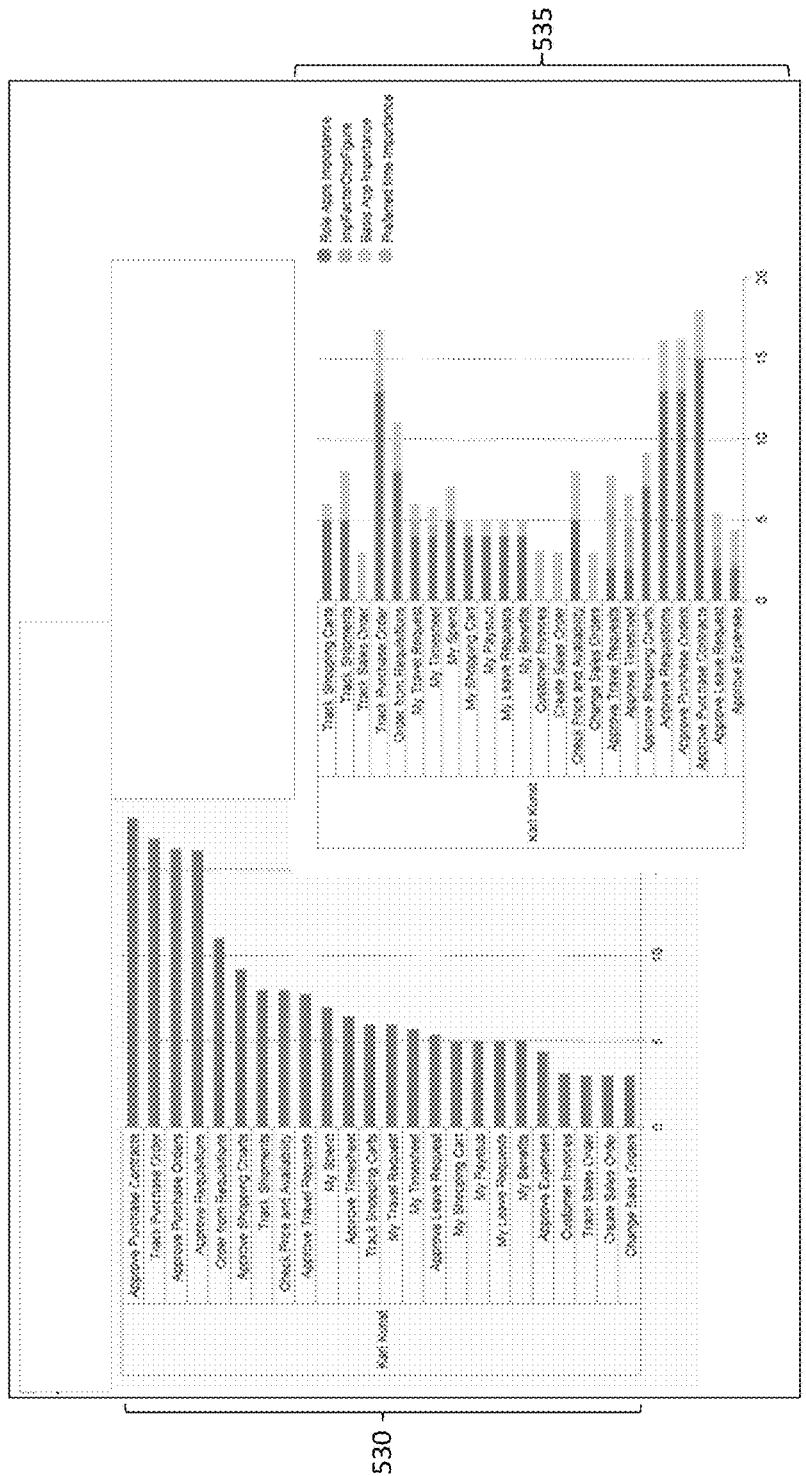

FIGS. 5B and 5C illustrate prioritized lists of a hypothetical user's relevant applications when the user is promoted from purchasing department employee (FIG. 5B) to purchasing project manager (FIG. 5C). Prioritized lists 520 and 530 illustrate the relevance of each application. Prioritized lists 525 and 535 breakdown the relevance of each application into individual importance parameter contributions. Urgency parameter contributions may also be incorporated into prioritized lists 525 and 535. As evident from FIGS. 5B and 5C, the change in the user's role from employee to project manager may shift the relevance of the user's applications. For example, whereas the "Track Purchase Order" application may be the most relevant application pre-promotion, the "Approve Purchase Contracts" application may be the most relevant application post-promotion. The shift in application relevance may correspond to a shift in duties from standard employee tasks to managerial tasks.

Figure 5D:
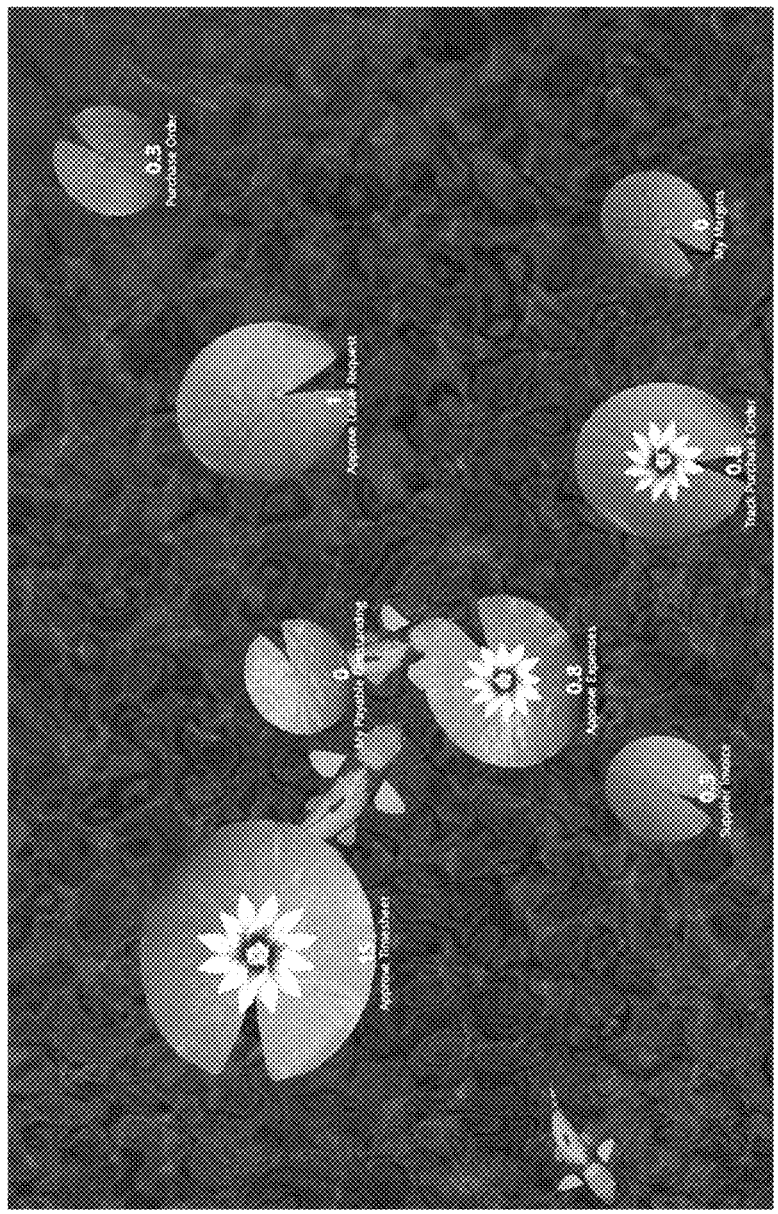

FIG. 5D illustrates yet another graphical representation 550 of the relevance of a user's applications. In this implementation, different sized lily pads may be used to represent the relevance of different applications. Highly relevant applications may be associated with large lily pads, and less relevant applications may be associated with small lily pads.

FIG. 6 illustrates a process 600 for displaying a graphical representation of various application relevance values.

At 610, the monitoring tool may receive information from one or more applications installed on a computing device. The received information may include any of the importance parameters defined in Table 1, any of the urgency parameters defined in Table 2, and values of the received importance and urgency parameters. In some implementations, the monitoring tool may receive this information when any of the applications are opened, closed, or during predetermined intervals while the application is open or closed. In some implementations, the monitoring tool may receive this information when a user causes the device to display a home screen.

At 620, the monitoring tool may determine the composite importance value for each application using the importance parameter values received at 610. In some implementations, the monitoring tool may calculate the composite importance value for an application using Equation 1.

At 630, the monitoring tool may determine the composite urgency value for each application using the urgency parameter values received at 610. In some implementations, the monitoring tool may calculate the composite urgency value for an application using Equation 2.

At 640, the monitoring tool may determine the relevance value for each application using the composite importance value and composite urgency value determined at 620 and 630, respectively. In some implementations, the monitoring tool may calculate the composite urgency value for an application using Equation 3.

At 650, the monitoring tool may display a graphical representation of various application relevance values on the computing device. This graphical representation may be any of the representations illustrated in FIG. 5A, 5B, 5C, or 5D.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

What is claimed is:

1. A non-transitory computer-readable medium containing instructions to configure at least one processor to perform operations comprising:
    receiving information, monitored from one or more applications installed on a device, the received information comprising one or more importance parameters associated with each application and one or more urgency parameters associated with each application, the one or more importance parameters having one or more corresponding importance parameter values, and the one or more urgency parameters having one or more corresponding urgency parameter values;
    determining a composite importance value for each application, the composite importance value based on the one or more importance parameter values associated with each application, the composite importance value for each application being equal to a sum of the one or more importance values of the one or more importance parameters associated with the application;
    determining a composite urgency value for each application, the composite urgency value based on the one or more urgency parameter values associated with each application;
    determining a relevance value for each application based on the composite importance value for each application and the composite urgency value for each application; and
    displaying a graphical representation of the relevance value of each application on the device, the graphical representation including a user interface having one or more icons representative of the one or more applications, each icon positioned on the user interface to indicate relevance in accordance with the determined relevance value.

2. The non-transitory computer-readable medium of claim 1 further comprising:
    ranking the relevance value of each application from a highest relevance value to a lowest relevance value before the displaying.

3. The non-transitory computer-readable medium of claim 2, wherein the graphical representation displayed on the device represents
    a prioritized list of the one or more applications, the prioritized list sorted based on the ranking.

4. The non-transitory computer-readable medium of claim 1, wherein the one or more urgency parameters of an application are associated with a timeliness of one or more activities performed by a user using the application.

5. The non-transitory computer-readable medium of claim 4, wherein the one or more urgency parameters of the application are based on at least a predetermined urgency value, one or more due dates associated with the one or more activities, a role of the user, a location of the user, a schedule of the user, and an amount of time required to perform the one or more activities.

6. The non-transitory computer-readable medium of claim 1, wherein the one or more importance parameters of an application are associated with one or more activities associated with one or more roles of a user.

7. The non-transitory computer-readable medium of claim 6, wherein the one or more importance parameters of the application are based on at least a predetermined importance value, a number of uncompleted activities, how often the application is used, when the application is used, a location of the user, a schedule of the user, whether the application is optimized for use on the device, whether the application requires network connectivity, and whether the device is connected to a network.

8. The non-transitory computer-readable medium of claim 1, wherein at least one of the one or more importance parameters is associated with a scaling variable, the scaling variable representing a weight of the at least one importance parameter.

9. The non-transitory computer-readable medium of claim 1, wherein the composite urgency value for each application is equal to a maximum urgency value of the one or more urgency parameters associated with the application.

10. The non-transitory computer-readable medium of claim 1, wherein the relevance value for each application is equal to $$\sqrt{\text{Composite Importance Value}^2 + \text{Composite Urgency Value}^2}.$$

11. The non-transitory computer-readable medium of claim 1, wherein the information is received from the one or more applications when the one or more applications are opened, when the one or more applications are closed, at predetermined intervals while the one or more applications are open, at predetermined intervals while the one or more applications are closed, or when a user causes the device to display a home screen.

12. A method comprising:
    receiving information, monitored from one or more applications installed on a device, the received information comprising one or more importance parameters associated with each application and one or more urgency parameters associated with each application, the one or more importance parameter having one or more corresponding importance parameter values, and the one or more urgency parameters having one or more corresponding urgency parameter values;
    determining a composite importance value for each application, the composite importance value based on the one or more importance parameter values associated with each application, the composite importance value for each application being equal to a sum of the one or more importance values of the one or more importance parameters associated with the application;
    determining a composite urgency value for each application, the composite urgency value based on the one or more urgency parameter values associated with each application;
    determining a relevance value for each application based on the composite importance value for each application and the composite urgency value for each application; and displaying a graphical representation of the relevance of each application on the device, the graphical representation including a user interface having one or more icons representative of the one or more applications, each icon positioned on the user interface to indicate relevance in accordance with the determined relevance value, wherein the receiving, the determining the composite importance value, the determining the composite urgency value, the determining the relevance value, and the displaying are performed by at least one processor.

13. The method of claim 12, further comprising:
ranking the relevance value of each application from a highest relevance value to a lowest relevance value before the displaying,
wherein the graphical representation displayed on the device represents
a prioritized list of the one or more applications, the prioritized list sorted based on the ranking.

14. The method of claim 12, wherein the one or more urgency parameters of an application are associated with a timeliness of one or more activities performed by a user using the application.

15. The method of claim 12, wherein the one or more importance parameters of an application are associated with one or more activities associated with one or more roles of a user.

16. A system comprising:
at least one processor; and
at least one memory, wherein the at least one processor and the at least one memory are configured to perform operations comprising:
receiving information, monitored from one or more applications installed on a device, the received information comprising one or more importance parameters associated with each application and one or more urgency parameters associated with each application, the one or more importance parameter having one or more corresponding importance parameter values, and the one or more urgency parameters having one or more corresponding urgency parameter values;
determining a composite importance value for each application, the composite importance value based on the one or more importance parameter values associated with each application, the composite importance value for each application being equal to a sum of the one or more importance values of the one or more importance parameters associated with the application;
determining a composite urgency value for each application, the composite urgency value based on the one or more urgency parameter values associated with each application;
determining a relevance value for each application based on the composite importance value for each application and the composite urgency value for each application; and
displaying a graphical representation of the relevance of each application on the device, the graphical representation including a user interface having one or more icons representative of the one or more applications, each icon positioned on the user interface to indicate relevance in accordance with the determined relevance value.

17. The system of claim 16, wherein the operations further comprise ranking the relevance value of each application from a highest relevance value to a lowest relevance value before the displaying,
wherein the graphical representation displayed on the device represents
a prioritized list of the one or more applications, the prioritized list sorted based on the ranking.

18. The system of claim 16, wherein the one or more urgency parameters of an application are associated with a timeliness of one or more activities performed by a user using the application.

19. The system of claim 18, wherein the one or more urgency parameters of the application are based on at least a predetermined urgency value, one or more due dates associated with the one or more activities, a role of the user, a location of the user, a schedule of the user, and an amount of time required to perform the one or more activities.

20. The system of claim 16, wherein the one or more importance parameters of an application are associated with one or more activities associated with one or more roles of a user.

21. The system of claim 20, wherein the one or more importance parameters of the application are based on at least a predetermined importance value, a number of uncompleted activities, how often the application is used, when the application is used, a location of the user, a schedule of the user, whether the application is optimized for use on the device, whether the application requires network connectivity, and whether the device is connected to a network.

22. The system of claim 16 further comprising:
ranking the relevance value of each application from a highest relevance value to a lowest relevance value before the displaying.

23. The system of claim 16, wherein at least one of the one or more importance parameters is associated with a scaling variable, the scaling variable representing a weight of the at least one importance parameter.

24. The system of claim 16, wherein the composite urgency value for each application is equal to a maximum urgency value of the one or more urgency parameters associated with the application.

25. The system of claim 16, wherein the relevance value for each application is equal to $$\sqrt{\text{Composite Importance Value}^2 + \text{Composite Urgency Value}^2}.$$

26. The system of claim 16, wherein the information is received from the one or more applications when the one or more applications are opened, when the one or more applications are closed, at predetermined intervals while the one or more applications are open, at predetermined intervals while the one or more applications are closed, or when a user causes the device to display a home screen.

* * * * *